Patented Feb. 10, 1925.

1,526,117

UNITED STATES PATENT OFFICE.

JOHN F. CASEY, OF PORTLAND, OREGON.

PROCESS OF MANUFACTURING CONCRETE BRICK.

No Drawing. Application filed December 26, 1923. Serial No. 682,760.

*To all whom it may concern:*

Be it known that I, JOHN F. CASEY, a citizen of the United States, residing at Portland, county of Multnomah, State of Oregon, have invented new and useful Improvements in the Process of Manufacturing Concrete Brick, of which the following is a specification.

This invention relates to the process of manufacturing concrete brick, the object being to provide a process by which such concrete brick may be manufactured in sand moulds by pouring liquid concrete thereinto, and a further object is to provide a process whereby such brick are provided with a weather-proof face upon five sides thereof as a part of the moulding process, and without any further handling or manipulation.

I accomplish the above objects by making a mould from a mixture of sharp sand known in the art as oil core sand, and a fine sand with a clay binder mixed therewith.

I use these ingredients in the proportions of one and one half volumes of fine sand with clay binder, and one half volume of oil core sand, adding just sufficient water to properly bind the mould together.

For the concrete brick I use a bank sand, such as is used for ordinary lime plaster, mixed with Portland cement in the proportions of sand 3, cement 1, and water 2¾ in volume.

I have discovered that when such a concrete mixture is poured into moulds of sand such as above described, the water in the concrete mixture drains away through the mould, and that in the process of draining it carries a certain amount of pure unmixed cement to the inner surface of the mould.

A mould made as above described is sufficiently porous to allow the water to drain off, but it is also sufficiently dense or compact to stop the cement at the inner surface of the mould, not allowing any of the cement to drain away with the water.

The result is that a very thin layer of the sand from which the mould is made unites with the free cement deposited thereupon by the draining process, and thus forms a thin facing upon the moulded brick of a mixture rich in cement and thus weatherproof. Furthermore, by using an oil core sand of various colors for the mould brick of various colors may be manufactured.

By experiment I have established the proportions of ingredients given above for the mould and the concrete as desirable for best results. The mould must not be so porous as to allow the water to drain away therethrough too fast, as that breaks down the form of the mould, and also allows the free cement to penetrate too far into the mould, which defeats the purpose of making a weatherproof face upon the brick and also results in an irregular lump of material instead of a perfectly formed brick. Also the mould must not be so dense as to retard the flow of water therethrough to such an extent as to allow time for the ingredients of the concrete to settle within the mould and the water to accumulate at the top thereof. The proportions of the mould given above are such as to allow the water to drain off with a substantially even rate of flow over the entire surface of the mould, and rapidly enough to prevent any settling of the ingredients of the concrete, and at the same time are sufficiently dense to prevent the passage therethrough of any of the free cement from the concrete.

The concrete must contain sufficient water to flow easily and to readily fill the mould so as to make sharp cornered brick, and also to carry sufficient free cement to the surface of the mould to unite with the sand thereof, and thus provide the weatherproof face of the brick. Insufficient water in the concrete will fail to carry the concrete into the sharp corners of the mould, and also will fail to carry sufficient free cement to the surface of the mould to make a weatherproof surface. Too much water in the concrete will allow the ingredients of the concrete to settle in the mould with the water at the top, and thus defeat the purpose of making a weatherproof facing upon the brick, because the water mostly draining away from the top of the mould will not carry free cement to the surface of the mould at the bottom thereof.

Having described my new process so that others may be enabled to use the same, what I claim as new, and desire to secure by Letters Patent, is:

1. The process of moulding concrete brick in a sand mould composed of sharp oil core sand, and fine sand containing a clay binder.

2. The process of moulding concrete brick in a mould composed of one and one half volumes of fine sand containing a clay binder, and one half volume of sharp oil core sand.

In witness whereof I claim the foregoing as my own I hereunto affix my signature in the presence of two witnesses at Portland, county of Multnomah, State of Oregon, this 9th day of Aug. 1923.

JOHN F. CASEY.

Witnesses:
L. J. ROBINSON,
C. F. BLAKE.